US007523470B2

(12) United States Patent
Garvey et al.

(10) Patent No.: US 7,523,470 B2
(45) Date of Patent: Apr. 21, 2009

(54) SYSTEM AND METHOD FOR DETECTING KEYBOARD LOGGING

(75) Inventors: Joseph F. Garvey, Cary, NC (US);
Kevin Himberger, Durham, NC (US);
Clark D. Jeffries, Chapel Hill, NC (US);
Mohammad Peyravian, Cary, NC (US)

(73) Assignee: Lenovo Singapore Pte. Ltd., Singapore (SG)

( * ) Notice: Subject to any disclaimer, the term of this patent is extended or adjusted under 35 U.S.C. 154(b) by 507 days.

(21) Appl. No.: 11/021,139

(22) Filed: Dec. 23, 2004

(65) Prior Publication Data

US 2006/0143708 A1    Jun. 29, 2006

(51) Int. Cl.
*G06F 13/00* (2006.01)

(52) U.S. Cl. .............................. 719/328; 726/2; 726/27

(58) Field of Classification Search ................. 719/328; 726/2, 27
See application file for complete search history.

(56) References Cited

U.S. PATENT DOCUMENTS

| 4,918,445 | A | | 4/1990 | Bower |
| 5,710,817 | A | | 1/1998 | Sjooquist |
| 5,978,475 | A | * | 11/1999 | Schneier et al. ............. 713/177 |
| 6,006,328 | A | | 12/1999 | Drake |
| 6,049,790 | A | | 4/2000 | Rhelimi |
| 6,054,940 | A | | 4/2000 | Greene |
| 6,470,388 | B1 | * | 10/2002 | Niemi et al. ................. 709/224 |
| 6,775,783 | B1 | * | 8/2004 | Trostle .......................... 726/6 |
| 7,194,623 | B1 | * | 3/2007 | Proudler et al. ............. 713/164 |
| 2006/0101277 | A1 | * | 5/2006 | Meenan et al. .............. 713/182 |
| 2006/0161987 | A1 | * | 7/2006 | Levy-Yurista ................ 726/24 |

* cited by examiner

*Primary Examiner*—Andy Ho
(74) *Attorney, Agent, or Firm*—Shelley M Beckstrand

(57) ABSTRACT

A kernel based detection of keyboard logger applications is achieved by configuring a call interface to the kernel to characterize a system call pattern for processes accessing a keyboard. A monitor thread iteratively examines a plurality of threads to test open( ), read( ), write( ), and syscall( ) system routines for conditions indicative of presence of a keyboard logger application. A thread whose system call pattern is characterized by such conditions is marked as a keyboard logger.

10 Claims, 13 Drawing Sheets

SYSTEM AND METHOD FOR DETECTING KEYBOARD LOGGING

BACKGROUND OF THE INVENTION

1. Technical Field of the Invention

The present invention relates generally to computer systems, and deals more particularly with detection of keyboard logging.

2. Background Art

Keyboard loggers (also referred to as keystroke sniffers, or sniffers, or spyware) are known today to log or record keystrokes entered by a user, and to transmit the keystroke information to a third party. The keystrokes may reveal valuable or confidential information such as a user ID and password, confidential financial information or confidential technical information. The user ID and password can later be used to access sensitive records.

A variety of mechanisms exist, such as email attachments (images or text), remotely executable malware, or malicious URLs that can install a keyboard logger without alerting the user that this has occurred. The user remains unaware that a keyboard logger has been installed until too late.

There are contemporary cases of keyboard logger attacks that have led to significant losses to the user or the company of the user.

Keyboard loggers take advantage of operating system "hooks" that allow additional code to be run. When "hooked" code runs, the keyboard logger code executes and then returns to the normal operating system code so the operating system appears to be working normally. In the case of a keyboard logger hook integrated into a normal keystroke processing, the keyboard logger code reads the keystroke and saves or transmits the keystroke, then passes control to the normal operating system call. Because of the speed of the hook routines, the user does not usually know that his or her keystroke has been logged by the keyboard logger.

To be successful, a keyboard logger has two critical tasks to perform beyond the obvious interception of a keystroke. First, the keyboard logger must hide itself. All modern operating systems possess one or more tools to list out the kernel's process table. If the keyboard logger process is recognizable in a process table list, then detection is trivial. As a result of these tools, keyboard loggers disguise their presence in some fashion. Keyboard loggers may exploit a bug or feature to be a hidden process, such as a process name of "" (empty string). Keyboard loggers may also masquerade as a known legitimate process.

The second critical task that a keyboard logger must perform is transmitting the keystroke data to another party. This can be done in some batch fashion (storing keystrokes to an obscure file on disk for later pickup), or transmitting each keystroke in real time over a network connection.

In modern operating system kernels, applications such as a keyboard logger must use the syscall interface to gain the access needed from the kernel, and cannot directly access the keyboard interface hardware (or any other hardware).

Three principle activities of a keyboard logger are:
1) Receipt of keystroke events.
2) Hiding the presence of a keyboard logger when the process table is examined.
3) Storing/transmitting the keystroke data (to/for another party).

Many applications have legitimate needs for keystroke event notifications. So, the first approach isn't a very reliable way to detect a keyboard logger. Consider the case of the "poor man's" editor (example for Microsoft shell).

```
$ type > poormans.txt
hello world
^Z
```

The keystrokes match the text saved to a file. This is classical keyboard logger behavior, except, this really isn't a keyboard logger, but a legitimate use of the computer. So, some other checks need to be added before concluding that a keyboard logger has been found.

SUMMARY OF THE INVENTION

The present invention provides a system, method and computer program product for kernel based detection of keyboard logger applications. A call interface to the kernel is configured to characterize a system call pattern for processes accessing a keyboard. A monitor thread iteratively examines a plurality of processes to test read( ), write( ), syscall( ), and open( ) system routines for conditions indicative of presence of a keyboard logger application.

Other features and advantages of this invention will become apparent from the following detailed description of the preferred embodiment of the invention, taken in conjunction with the accompanying drawings.

DESCRIPTION OF THE PREFERRED EMBODIMENT

In accordance with the preferred embodiment of the invention, there is provided a system and method for kernel based detection of keyboard logger applications. For this preferred embodiment of this invention, the method and system comprise modified syscall( ), open( ), read( ), and write( ) routines for a modern operating system kernel. In addition a monitor thread is added to the operating system kernel.

In order to understand this preferred embodiment of this invention, a basic understanding of a modern kernel is needed.

Figure 1:
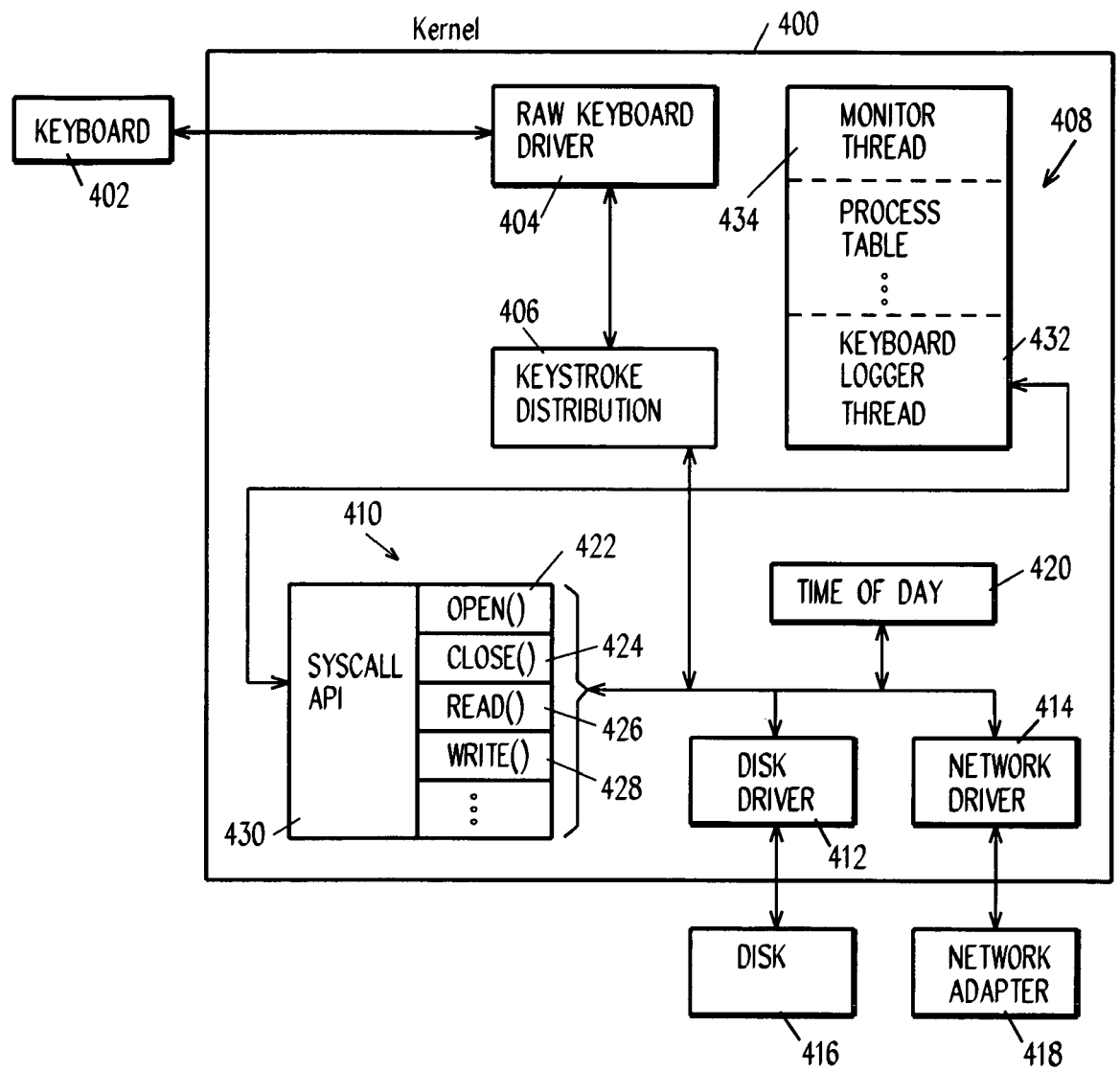
FIG. 1 is a high level system diagram illustrating basic kernel organization.

Referring to FIG. 1, modern kernel 400 includes a raw keyboard driver 404 connected to keyboard 402. Keyboard driver 404 is connected to keystroke distribution module 406 which is connected to system call (syscall) components 410, time of day component 420, disk driver 412 to disk storage 416, and network driver 414 to network adapter 418. Syscall component 410 is connected to process table 408. Syscall components 410 typically include open( ) 422, close( ) 424, read( ) 426, and write( ) 428.

In operation, a keystroke is generated by keyboard 402. Raw keyboard driver 404, in kernel 400, receives the keystroke. Raw keyboard driver 404 then must distribute the keystroke to one or more processes. There are two different ways (serial and parallel) that keystroke distribution 406 can be performed. These are discussed further in later sections.

In the preferred embodiment of this invention, when a keystroke occurs, a keyboard driver processes the keystroke into the kernel. The kernel then implements one of two forms of keystroke distribution to present the keystroke to one or more applications interested in keyboard activity. The application then uses the syscall interface to read( ) the keystroke.

A keyboard logger typically is a thread or process. That means the keyboard logger thread 432 must be one of the entries in process table 408. As such, it must use system calls 410 to access hardware, such as keyboard 402, disk 416, or network adapter 418. Syscall API 430 has a primary function of enabling the proper privileges (changing from user privileges to kernel privileges) so that hardware can be accessed. The desired hardware or kernel functionality can then be accessed. This allows access to keystroke distribution 406, disk driver 412, network driver 414, or time of day 420. This access allows the keyboard logger to save keystrokes to disk 416, or send keystrokes to the network adapter 418 and onto a remote computer.

Figure 2:
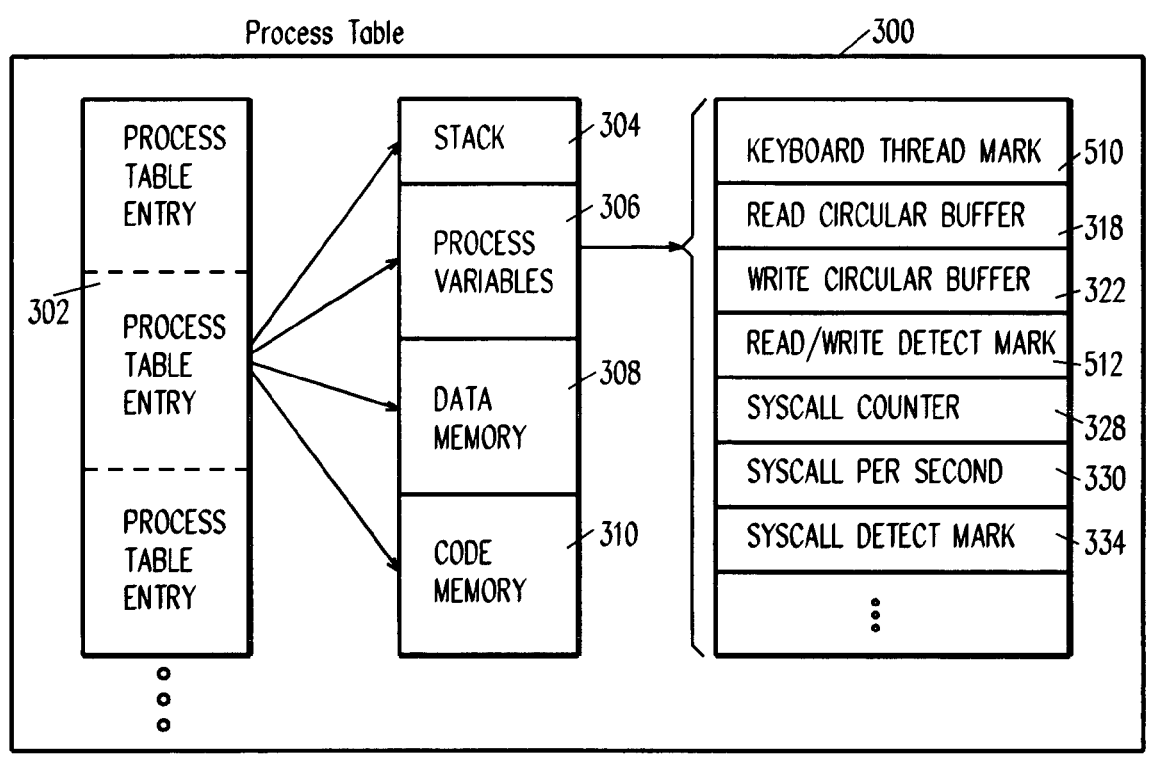
FIG. 2 is a diagrammatic illustration of a typical process table.

Referring now to FIG. 2 in connection with FIG. 1, process table 300 and 408 consist of multiple process table entries 302. Process table 300 is the central data structure of kernel 400. Each process table entry contains stack 304, process variables 306, data memory 308, and code memory 310. For the preferred embodiments of this invention, when a process is executing kernel code on a computer, it is necessary that that process be able to access process variables 306, such as keyboard thread mark 510, read circular buffer 318, write circular buffer 322, readwrite detect mark 512, system call counter 328, system calls per second 330, and system call detect mark 334.

When trying to detect keyboard loggers, two different keystroke distribution architectures, generally referred to as serial and parallel, must be considered.

Serial Keystroke Distribution Architecture

In the first architecture, any keystroke processing is serial in nature. An example of serial keystroke processing is a terminal connected to a computer via a serial port or Ethernet.

Figure 3:
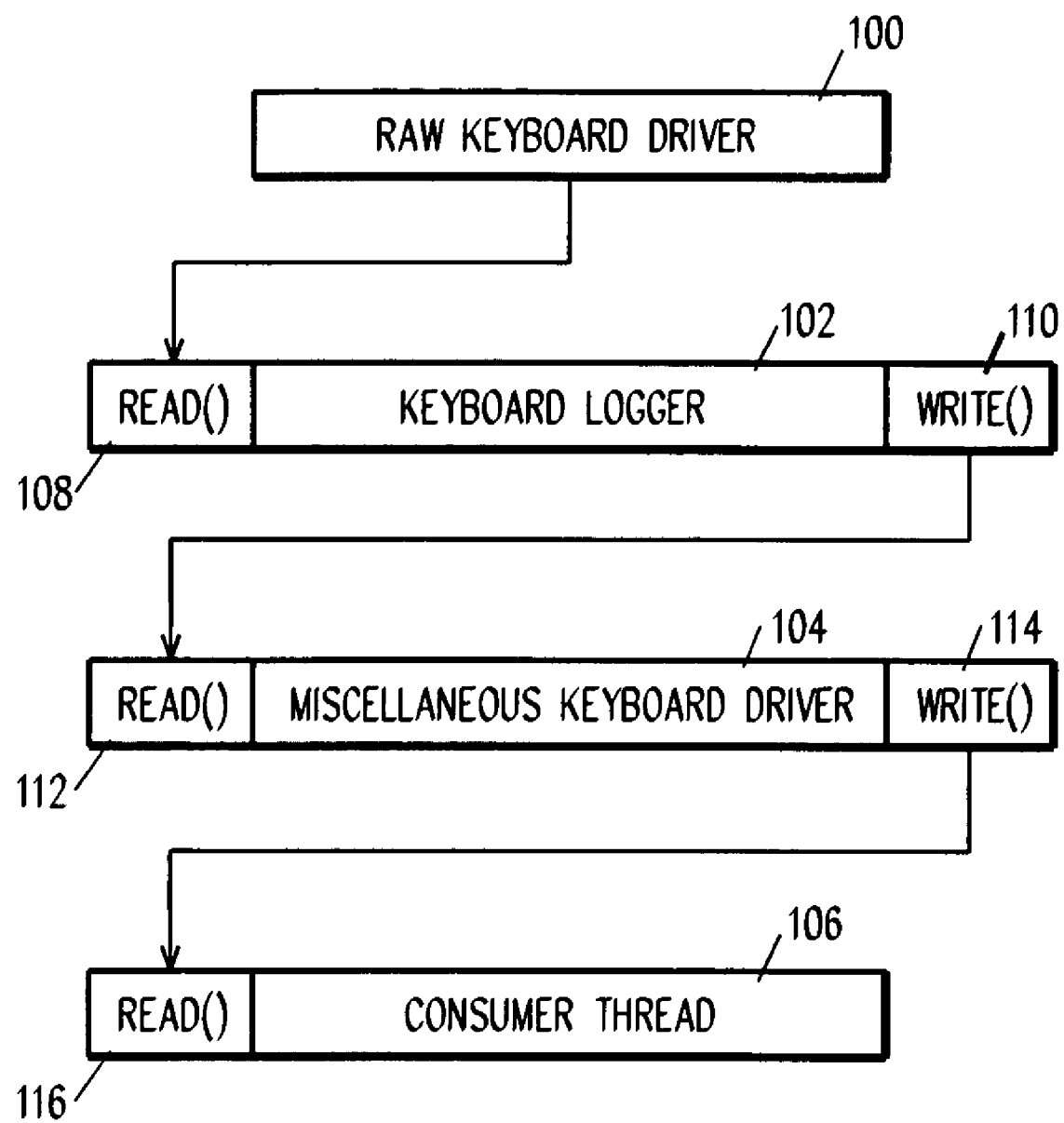
FIG. 3 is a diagrammatic illustration of serial keystroke distribution.

Referring to FIG. 3, serial keystroke distribution is illustrated. Keystrokes may be processed by kernel modules. These kernel modules are inserted serially between raw keyboard driver 100 and consumer thread 106 which, for example, might be part of a spreadsheet application or text editor (not shown). Other modules such as keyboard driver 104 can be inserted to perform various processing on the keystrokes, such as conversion to Unicode. A keyboard logger module 102 would also have to be serial in nature to work in this architecture. That is, for each keystroke read( ) call 108, 426 by keyboard logger 102, there must be a corresponding write( ) call 110, 428, with the read( )/write( ) calls occurring close in time (less than 100 mSec in today's technologies), otherwise keyboard 402 user would notice lost keystrokes, or excessive latency and investigate the source of the problem.

In accordance with an exemplary embodiment of the invention, for serial keystroke processing, the keystroke read( )/write( ) calls are paired by thread, and write( ) data 110 is checked against the previous read( ) data 108. Any thread where read( ) 108/write( ) 110 data repeatedly matches is immediately suspected of being a keyboard logger 102.

Once keyboard logger 102 is detected, appropriate action may be taken. Typically, this involves further screening to eliminate processes such as editors which really are nothing more than special keyboard loggers.

Further in accordance with the preferred embodiment of the invention, for serial keystroke processing, the system is designed so that a thread is marked when it inserts a module in the keystroke processing (chain). Each read( ) call 108, 112, 116 is set so that any thread dealing with keystrokes is recognized, and the keystroke is logged in a small circular buffer 318 (FIG. 2).

In a similar fashion, write( ) call 110, 114 is set to detect if it is being called as part of a keyboard processing thread, and compares the read circular buffer 318 to the write circular buffer 322. If the keystrokes in the circular buffers match, then a probable keyboard logger 102 is recognized.

A keyboard logger will be forced to use a write( ) system call 428 to pass on its information (machine, network address, keystroke payload, etc). Write( ) system call 428 is used for both writing to disk 416 and for writing to a network port 418. Since keyboard logger 102 has more information than just the keystroke data, write 110 will not be a perfect match to the keystroke data. This means that any detection algorithm based on recognizing keystrokes will be imperfect. The solution is to add a comparison algorithm that can deal with a near match, such as the 'leaky bucket' algorithm. This also allows the use of thresholds to avoid false detections. ("Leaky bucket is a reference to an algorithm that behaves like a leaky bucket. A counter (the bucket) is periodically incremented (water added), while the counter is steadily decremented (bucket leaking).

Depending on the difference in the increment and decrement rates the bucket will fill or empty. If the bucket fills (reaches a set threshold), then an action can be taken. Saturation arithmetic is used for the counter. It can never decrement below zero, or rollover when the value in the counter gets too large.)

One of the major advantages of this approach is that the detection algorithm runs when keystrokes occur, so that the overhead this processing requires is easily tolerated by even the most high performance operating systems.

Parallel Keystroke Distribution Architecture

In the second architecture, keystroke distribution is parallel in nature. In this keystroke distribution architecture, modules that want keystroke information connect in parallel. This means the timing/latency forcing keystrokes to be processed immediately in the serial architecture isn't present. However, the detection approach for a serial keystroke distribution architecture was selected because it can be adapted to a parallel keystroke distribution architecture.

Figure 4:
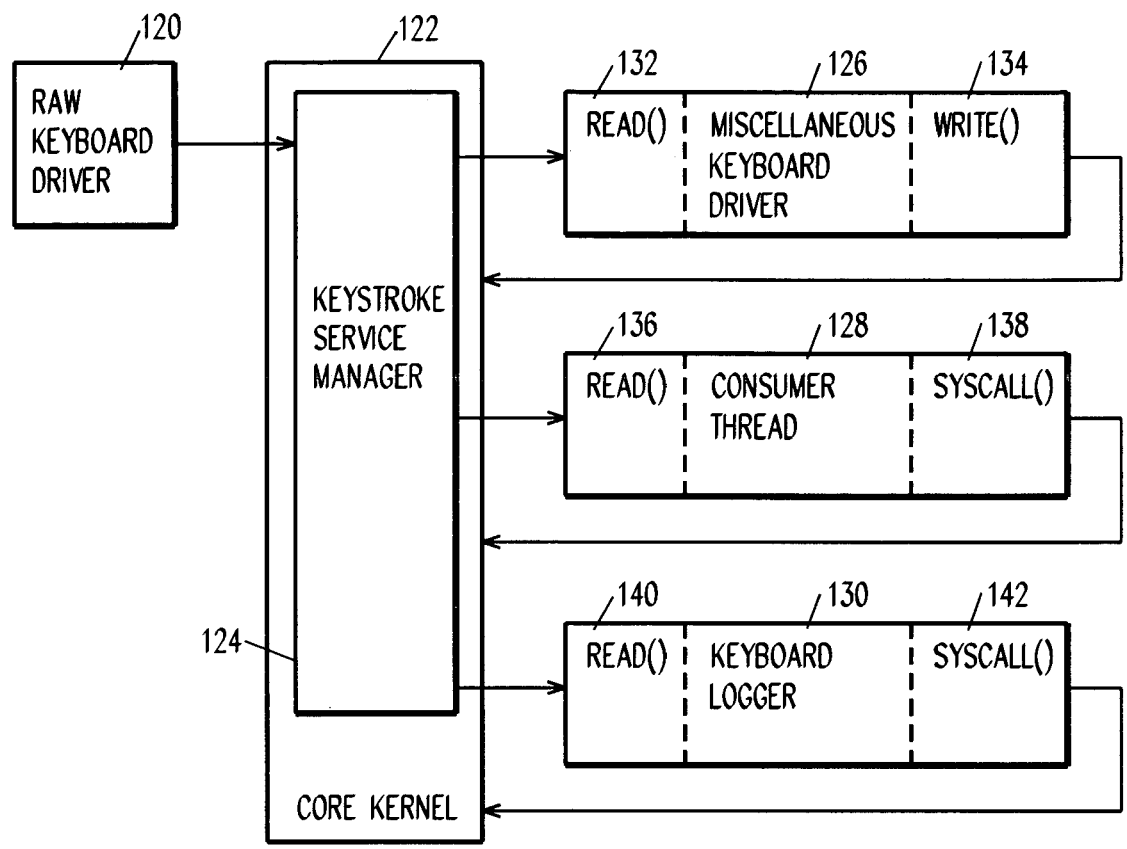
FIG. 4 is a diagrammatic illustration of parallel keystroke processing.

Referring now to FIG. 4, raw keyboard driver 120 gets a keystroke from keyboard 402 and passes it to keystroke service manager 124 in core kernel 122, 400. Keystroke manager 124 can then pass the keystroke through other keyboard driver modules 126 via read( ) 132 that might do keystroke to Unicode conversion and return a character to the keystroke manager 124 via write( ) 134 for further distribution. A consumer thread 128 or a keyboard logger 130 would then read a keystroke from the keystroke service manager 124 via read( )

136, 140, and finish processing the keystroke via syscall 138, 142, respectively. This keystroke distribution architecture is especially good at delivering the same character to multiple applications.

In accordance with this exemplary embodiment of the invention for parallel keystroke processing, when threads 128 or 130 open keyboard device 402 and are connected to keystroke service manager 124, these are marked, using keyboard thread mark 510, so that subsequent system calls know these threads should be monitored. A keyboard logger thread will be unique in that it will read every character, and do only occasional write( ) calls. A text editor on the other hand will do many system calls to modify the display screen (not shown). In addition, keyboard logger 130 will persist over a period of hours or days, unlike typical consumer thread 128. So, an additional modification (described hereafter) of kernel's 122 system call interface is added, thereby enabling keyboard logger 130 to be trapped by examination of its system call 142 pattern when keyboard logger 130, 432 issues a write( ) 428 as syscall( ) 142, 410.

To detect keyboard logger 130, the pattern of system calls, kept by core kernel 122, is examined on a keystroke by keystroke basis. Keyboard logger 130 is detected when, during a write( ) 428, it is observed that relatively few syscalls 142, 410 have been made by this thread and read( ) 426 and write( ) 428 calls are the most frequent syscalls 142, 410, and the data being written repeatedly matches the read circular buffer.

Given that keystrokes are very slow compared to software execution speed on any modern platform, this calling pattern check is not a computational load on the operating system of any significance.

Operating System Modifications

In order for a kernel to detect a keyboard logger, a number of changes must be made from standard designs. From the previous descriptions one can see that multiple areas of the kernel are impacted.

Referring again to FIG. 1, syscall API 430, is updated to record information on the pattern of system calls. In addition, the open( ) 422, read( ) 426, and write( ) 428 syscalls are also modified as will be explained hereafter. A monitor thread 434 is added to process table 408. Information, such as the pattern of syscalls must be kept on a per process 302 basis. Referring to FIG. 2, process variable area 306 of process table entry 302 is updated with new variables.

Figure 5:
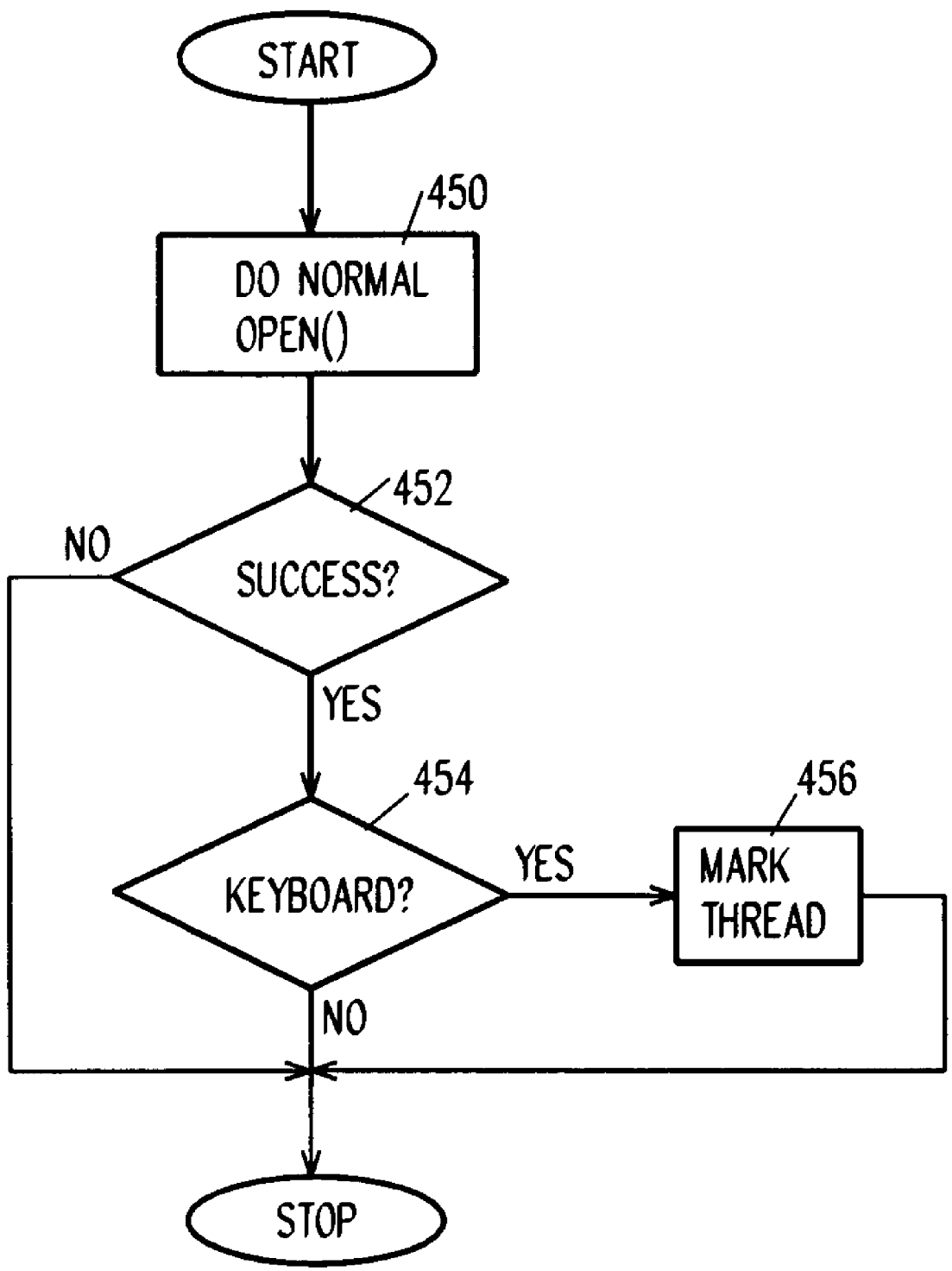
FIG. 5 is a flow chart illustrating the modified open( ) call in accordance with a preferred embodiment of the invention.

Referring now to FIG. 5 in connection with FIGS. 1 and 2, in accordance with an exemplary embodiment of the invention, initially there are no processes in process table 300, 408 that access keyboard 402. When a process is created and added to the process table 300, 408, all process variables 306 related to this invention are set to the desired default values. Eventually, one of the processes in process table 300, 408 will perform an open( ) 422 syscall. In step 450, normal open( ) actions are performed. If it is determined in step 452 that the normal open( ) of step 450 was not successful, then open( ) 422 completes. If the open( ) 422 of step 450 was successful, then in step 454 it is determined if the device that was opened is keyboard 402. If the device that was opened is keyboard 402, then in step 456, keyboard thread mark 510 is marked to indicate the calling process 300, 408 is attached to keyboard 402.

Figure 6:
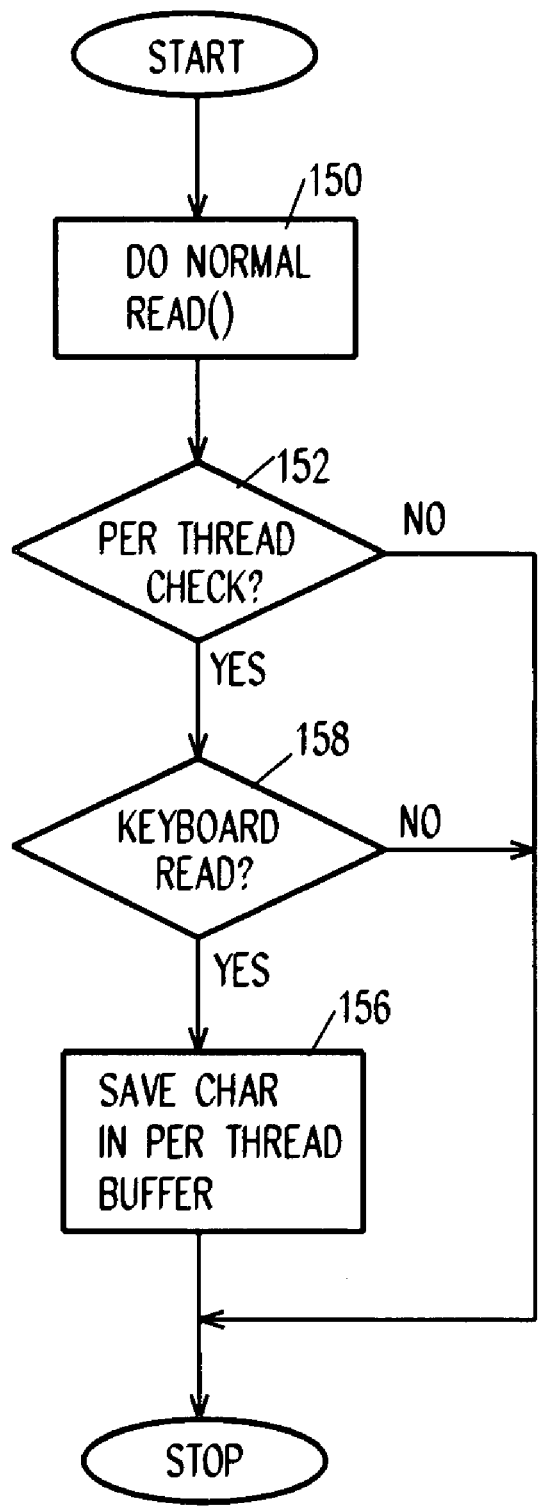
FIG. 6 is a flow chart illustrating the modified read( ) syscall of a preferred embodiment of the invention.

Referring now to FIG. 6 in connection with FIGS. 1 and 2, for a serial or parallel keystroke distribution architecture, any process in process table 408 initiates a read( ) 426 system call 410. When read( ) 426 is executed, then in step 150 normal actions are performed. If in steps 152, 158 it is determined that the process has been marked by examining keyboard thread mark 510, and the device being read from is keyboard 402 (directly or indirectly), then in step 156 the characters read are recorded in read circular buffer 318.

Figures 7, 7A:
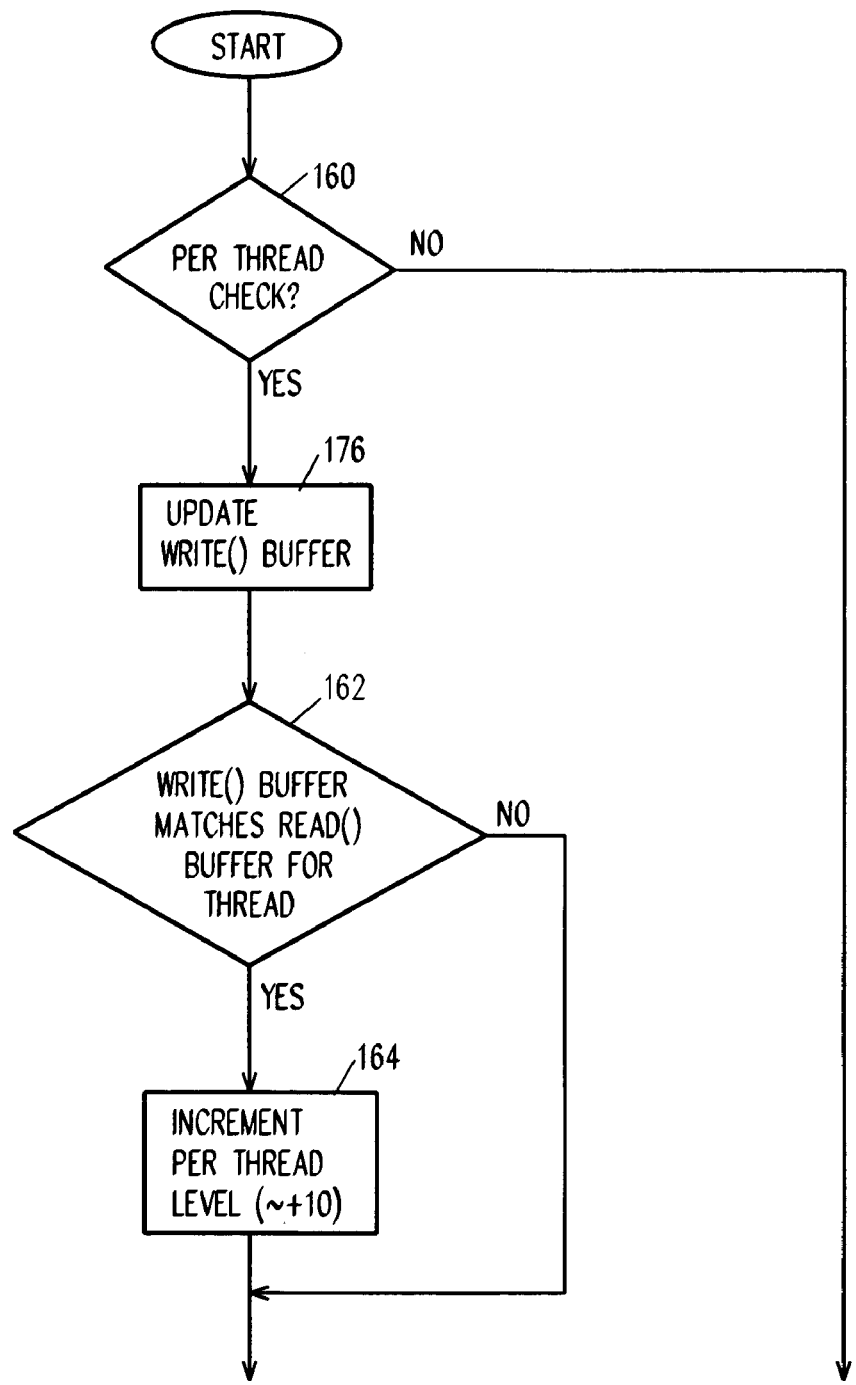
FIG. 7 is a flow chart illustrating the modified write( ) syscall of a preferred embodiment of the invention.
Figure 7B:
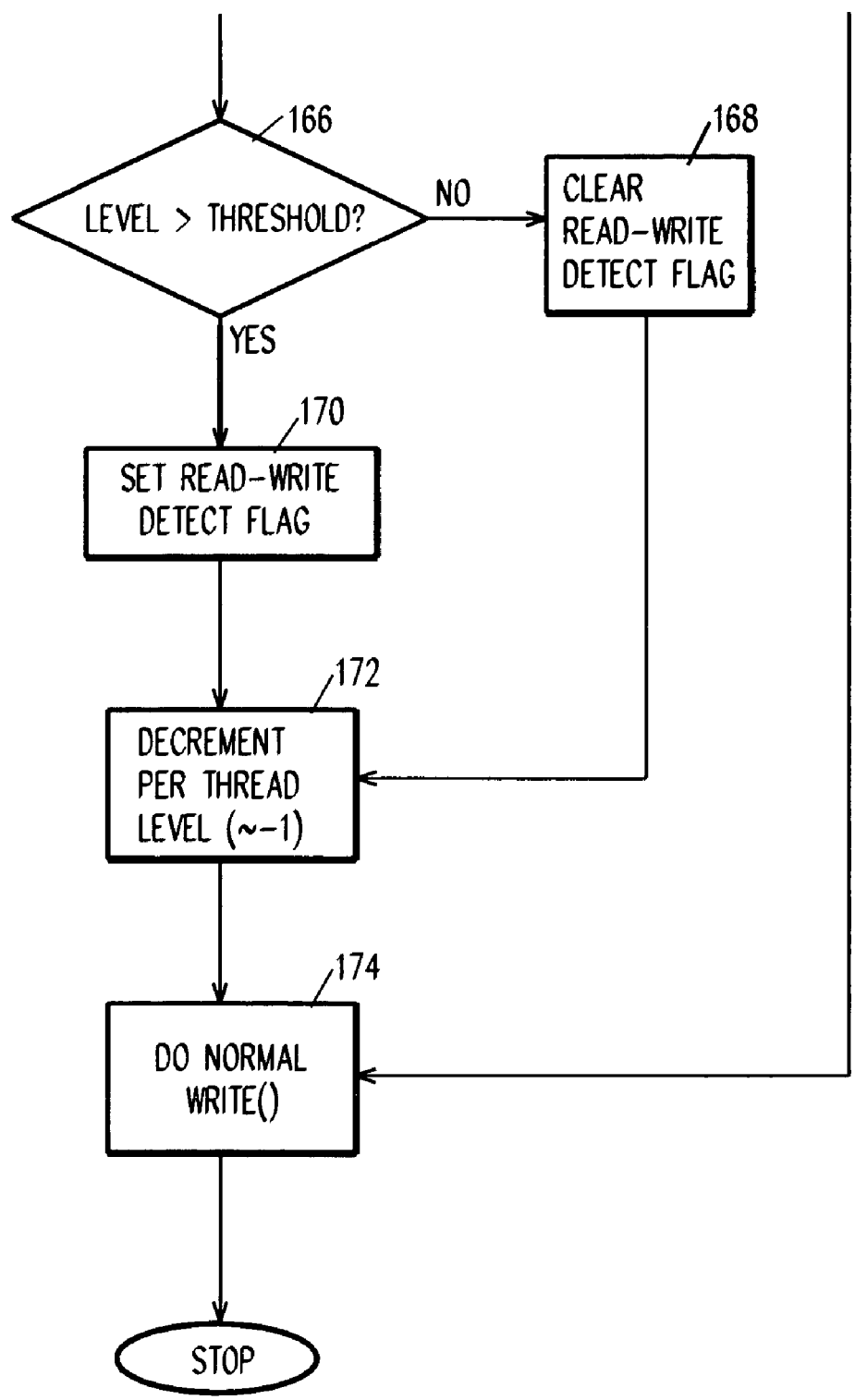

Referring now to FIG. 7 in connection with FIGS. 1 and 2, for serial or parallel keystroke distribution architecture, any process in process table 408 initiates a write( ) 428 system call 410. When write( ) 428 is executed, in step 160 a keyboard thread check is made by examining keyboard thread mark 510. If the thread has not been marked as using keyboard 402, then in step 174 the normal write( ) actions are performed. If the thread has been marked as using keyboard 402, then in step 176 the data to be written is added to write circular buffer 322. In step 162 a substring search is made to find if the read circular buffer 318 data also appears in write circular buffer 322. If the data to be written matches the read data, then in step 164, in accordance with the leaky bucket algorithm, a read-write match level is incremented. In step 166, if it is determined that the match level is above/below a match threshold, then in step 170 keyboard logger read-write detected flag 512 is set, or in step 168 it is cleared. In step 172, the read-write match level is then decremented by a fixed amount. The match increment is typically larger than the standard decrement in the leaky bucked algorithm. Finally, in step 174, execution of write( ) 428 finishes by doing the normal write( ) processing by performing the actions that would have been performed prior to this invention.

Figures 8, 8A, 8B:
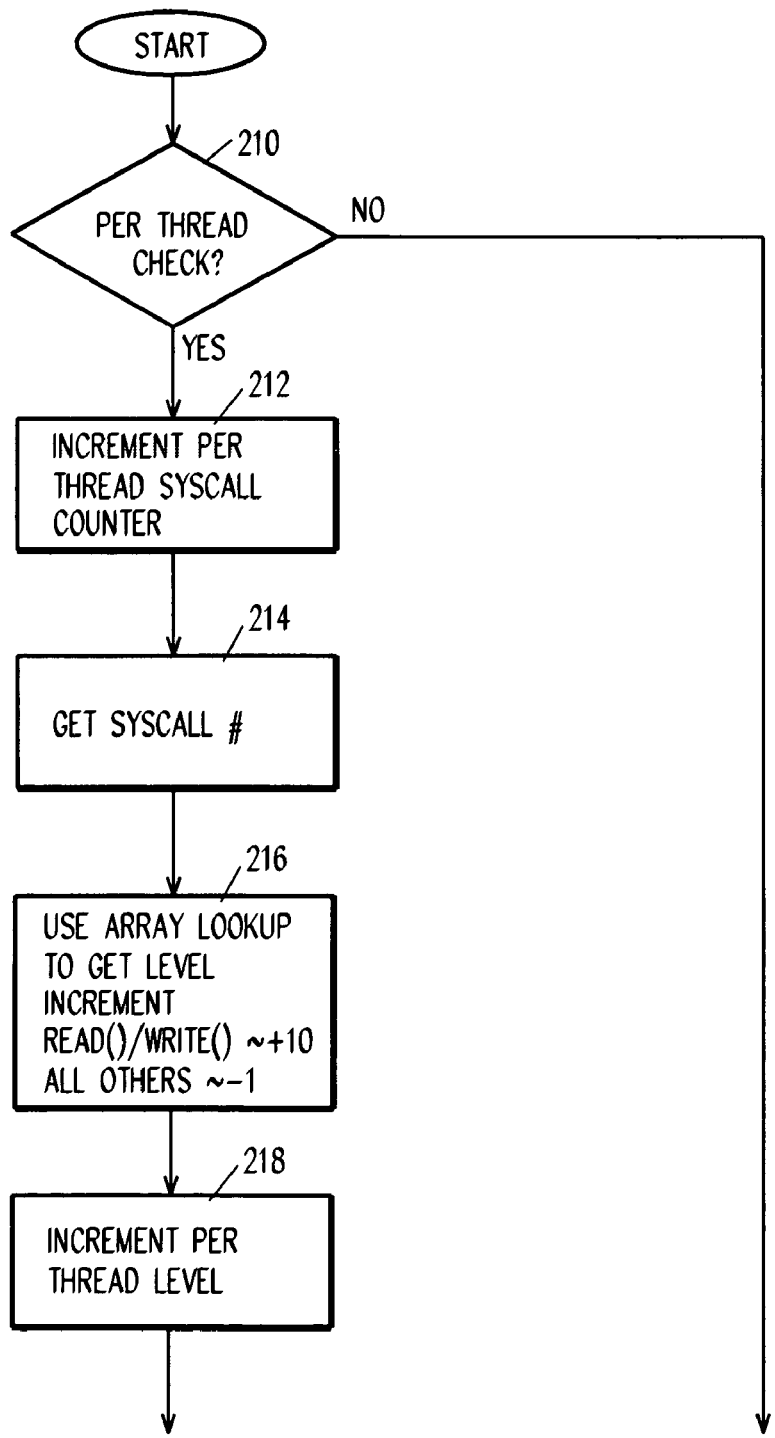
FIG. 8 is a flow chart illustrating the modified syscall( ) of a preferred embodiment of the invention.
Figure 8B:
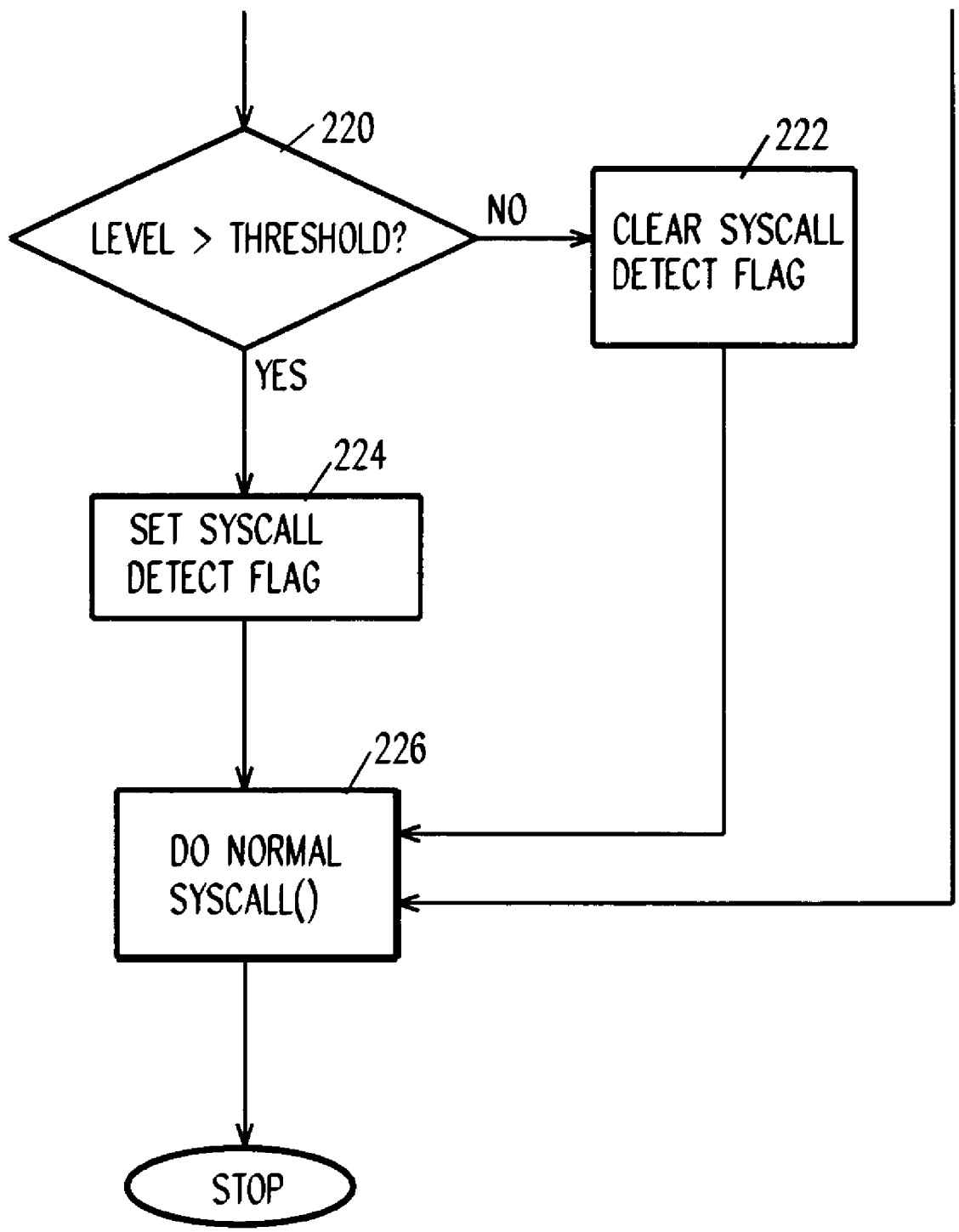

Referring now to FIG. 8 in connection with FIGS. 1 and 2, for a serial or parallel keystroke distribution architecture, any process in process table 408 initiates a system call 410 via Syscall API 430. In step 210, Syscall API 430 starts by determining if the current thread is using keyboard 402 by examining keyboard thread mark 510. If the current thread is not using the keyboard, in step 226 the normal actions prior to this invention are performed. If this thread is a keyboard user, then some process variables 306 need to be updated. First, in step 212, syscall counter 328 is incremented. Next, since syscalls are typically organized as an array, in step 214 the syscall number is determined. The syscall number is used to lookup an increment value for the syscall. Read( ) 426 or write( ) 428 syscalls are given an increment value which reward them, and all other syscalls are penalized. A typical reward might be an increment of +10, while a typical penalty might be an increment of −1. In step 216, the reward/penalty is computed by examining a simple lookup table based on the syscall number from step 214. In step 218, the increment from step 216 is then applied to a syscall level. In step 220, the syscall level 328 is then compared to a user controllable threshold. The result of this comparison is either in step 224 to set the syscall detect flag 334 or in step 222 to clear the syscall detect flag 334. Finally, in step 226, the normal syscall actions prior to this invention are preformed.

Figure 9A:
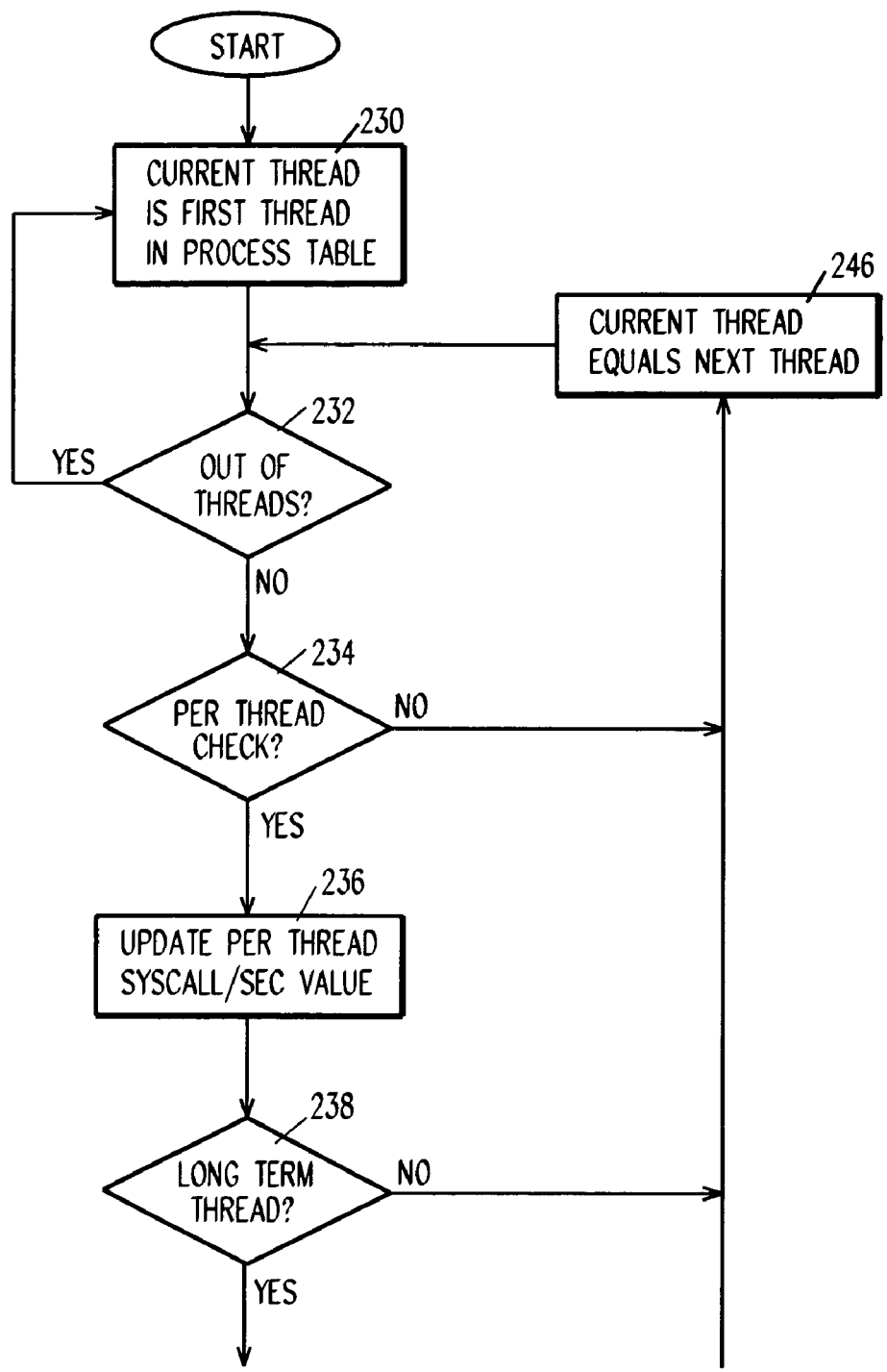
FIG. 9 is a flow chart illustrating the monitor thread of a preferred embodiment of the invention.
Figure 9B:
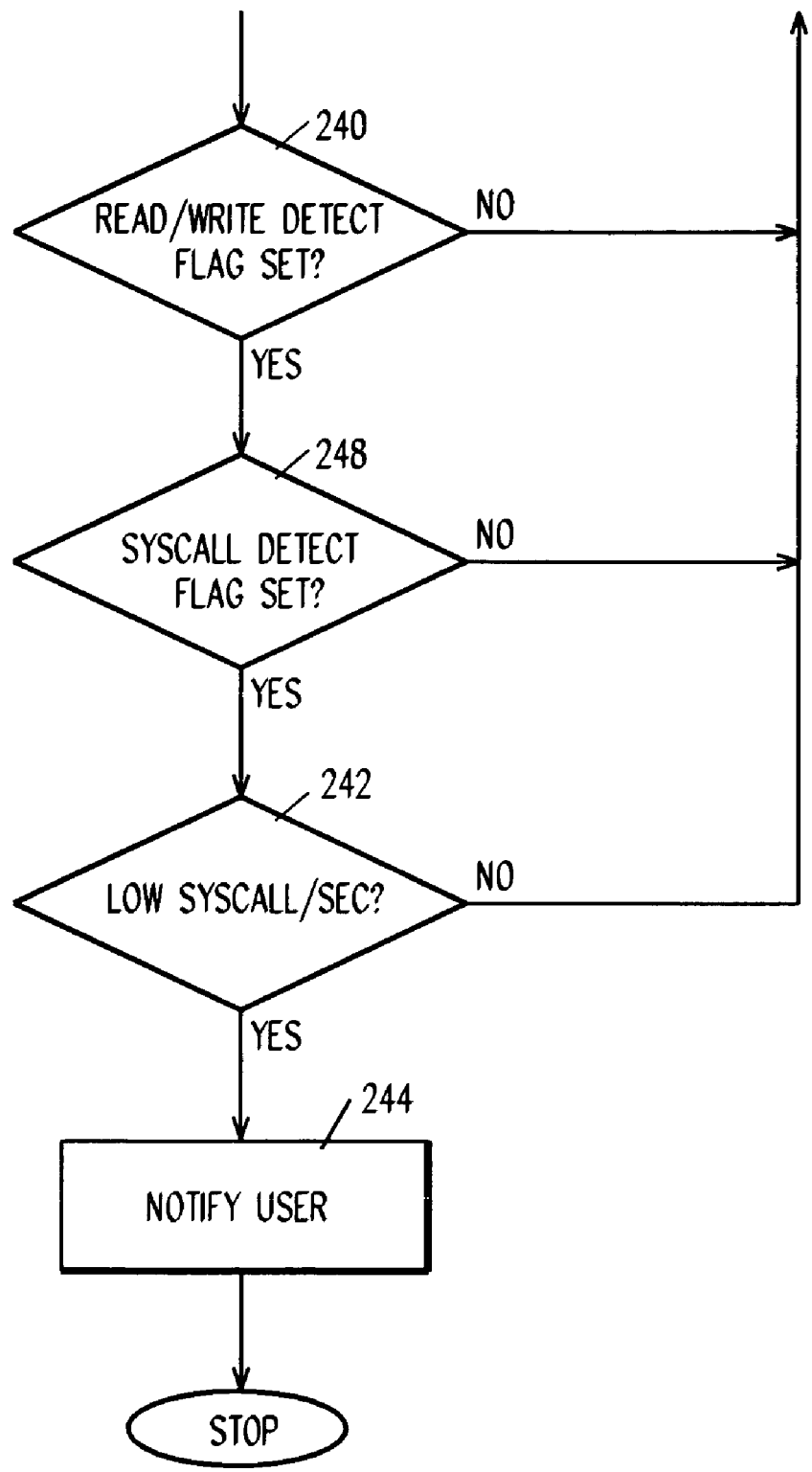

Referring to FIG. 9 in connection with FIGS. 1 and 2, monitor thread 434 is added to kernel 400, is automatically started by the kernel, and executes as follows.

In step 230, monitor thread 434 selects the first process in process table 408 to be the current thread. If there are no more threads, then step 232 restarts the sequence of searching all threads. If there is a current thread, in step 234 it is determined if the thread is accessing keyboard 402, by examining keyboard thread mark 510. If not, in step 246 the current thread is stepped to the next thread in process table 300, 408. If the current thread is accessing keyboard 402, in step 236 syscall/second value 336 for the current thread is updated by examination of time of day 420 and process variables 306. In step 238 it is determined if the current thread is transient, that is the thread is around just a few seconds or minutes, again by examination of time of day 420 and process variables 306.

If the thread hasn't been around more than several minutes (typically), then it isn't a keyboard logger, and in step 246 execution of monitor thread 434 moves to the next entry in process table 300, 408. In step 240, if the write( ) syscall 428 has not marked the thread as a keyboard logger, using keyboard thread mark 510, then monitor thread 434 moves on in step 246 to the next process table entry. Next, in step 248, the current thread is checked to see if syscall API 430 has marked the thread as a keyboard logger thread 432 in syscall detect mark 334. Next, in step 242 the current thread is checked for a low syscall/second value against a threshold. If the current thread is very active, then it probably isn't a keyboard logger. If the current thread writes data that more or less matches keystrokes, is doing mostly read( )/write( ) syscalls, and is doing syscalls slowly, then a keyboard logger is detected and in step 244 is reported to the user.

Further with regard to steps 236 and 238, the time for computations may be tracked. A fixed time interval is probably be preferred (every second this calculation is made). Alternatively, keeping track of how long since the last time the value was updated may be done. This would require recording the last time the value was updated and it's value. The calculation itself may be a weighted average because it requires the minimum data to be kept, and has the property of changing slowly and smoothly.

Advantages Over The Prior Art

It is an advantage of the present invention that there is provided an improved system, method, and program storage device for detecting keyboard loggers.

Alternative Embodiments

Figure 10:
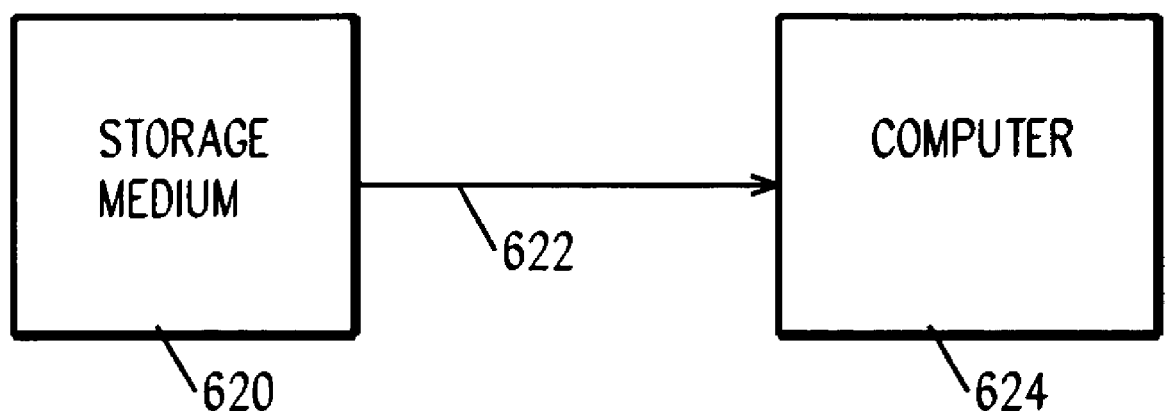
FIG. 10 is a high level system diagram of a typical computer configuration showing a signal store.

It will be appreciated that, although specific embodiments of the invention have been described herein for purposes of illustration, various modifications may be made without departing from the spirit and scope of the invention. In particular, referring to FIG. 10, it is within the scope of the invention to provide a computer program product or program element, or a program storage or memory device 620 such as a solid or fluid transmission medium, magnetic or optical wire, tape or disc, or the like, for storing signals readable 622 by a machine, for controlling the operation of a computer 624 according to the method of the invention and/or to structure its components in accordance with the system of the invention.

Those persons of ordinary skill in the art of kernel design will be able to adapt the techniques shown here to kernel designs other than that described in connection with the preferred embodiment of this invention. Some such adaptations or extensions include applications that contain keyboard loggers. These kernel designs will have an API, just like syscall API 430, and therefore loggers can be detected in the same fashion.

It is possible that some operating systems may allow processes access to the keyboard interrupt code. This is a really bad idea, but possible. What this does is virtualize the keyboard distribution (it's clearly the parallel case, since anything that wants access can get it). This is just a variation on a theme. For this alternative embodiment, the open( ) is replaced with a syscall to add code to the keyboard IRQ processing, the read( ) is just the normal keyboard IRQ routine.

Further, each step of the method may be executed on any general computer 624, such as IBM Systems designated as zSeries, iSeries, xSeries, and pSeries, or the like and pursuant to one or more, or a part of one or more, program elements, modules or objects generated from any programming language, such as C++, Java, P1/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method executing in a computer system for detection of keyboard logger applications, comprising:
   configuring a call interface to identify a system call pattern for processes accessing a keyboard;
   executing a monitor thread iteratively to examine a plurality of threads to test system routines selectively including open( ), read( ), write( ), syscall( ) or other data input/output system routines for conditions indicative of presence of a keyboard logger application, and
   characterizing as a possible keyboard logger a process that meets one or more of said conditions.

2. The method of claim 1, further comprising:
   maintaining a pattern of system calls on a per thread basis;
   said monitor thread identifying a thread as said keyboard logger application selectively upon determining that said thread is accessing said keyboard; that a value derived from said thread's system calling pattern exceeds a threshold; that a frequency of said thread's system calls exceeds a threshold; that write data substantially matches keystrokes, read( ) and write( ) system calls predominate and are issued relatively slowly; or that said thread has existed for an extended period of time.

3. The method of claim 1, further comprising:
   executing said monitor thread for iteratively examining said plurality of threads in a process table; and
   identifying a target thread as said keyboard logger application upon determining that a low frequency of system calls have been made by said target thread, and read( ) and write( ) calls are most frequent system calls; said target thread has existed for an extended period of time; or data being written repeatedly matches previously read keystrokes; and said target thread is accessing said keyboard.

4. The method of claim 1, further comprising:
   marking threads which access said keyboard;
   storing data read from said keyboard in a first circular buffer;
   storing data that has been written in a second circular buffer;
   responsive to determining that a thread which is writing out data has been marked as accessing said keyboard, searching said first circular buffer for corresponding read keystrokes;
   maintaining a match level value for each thread marked as accessing said keyboard, said match level value being incremented by a first value when said write data matches said read data and decrementing said match level value by a second value when said write data does not match any read data in said first circular buffer;
   selectively clearing and setting a keyboard logger detected flag for said thread responsive to said match level value;
   maintaining a second match level value for each thread marked as accessing said keyboard, said second match level value being incremented by a third value when said thread executes a read or a write operation, and decrementing said second match value by a fourth value when said thread makes a system call which is other that said read or write operation; and selectively clearing and setting a second keyboard logger detected flag for said thread responsive to said second match level value.

5. A computer program product for detecting keyboard logger, said computer program product comprising:

a computer readable medium;

first program instructions to identify a system call pattern for thread accessing a keyboard;

second program instructions to iteratively examine a plurality of threads to test status generated by open( ), read( ), write( ), and syscall( ) and other data input/output system routines for conditions indicative of presence of a keyboard logger application, third program instructions to characterize as a possible keyboard logger a thread whose system routine pattern is characterized by at least one of said conditions; and wherein said first, second and third program instructions are recorded on said medium.

6. The computer program product of claim 5, further comprising fourth program instructions to provide a pattern of system calls on a per thread basis;

fifth program instructions to execute a monitor thread for iteratively examining said plurality of threads;

said monitor thread identifying a target thread that is relatively active against a threshold value on rate of system calls as said keyboard logger application;

said monitor thread identifying said target thread as a keyboard logger application where write data substantially matches keystrokes, and read( ) and write( ) system calls predominate and are issued relatively slowly; and wherein said fourth and fifth program instructions are recorded on said medium.

7. The computer program product of claim 5, further comprising fourth program instructions to execute a monitor thread for iteratively examining said plurality of threads in a process table; and fifth program instructions, for a write( ) operation in a thread, to identify said thread as said possible keyboard logger application upon observing that relatively few system calls have been made by said thread, read( ) and write( ) calls are most frequent system calls, and data being written repeatedly matches a circular buffer maintained by said read( ) calls; and wherein said fourth and fifth program instructions are recorded on said medium.

8. The computer program product of claim 5, further comprising fourth program instructions to mark threads which access said keyboard;

fifth program instructions to store data read from said keyboard in a circular buffer;

sixth program instructions, responsive to determining that a current thread issuing a write system call has been marked as accessing said keyboard, to search said circular buffer for corresponding read data;

seventh program instructions to maintain a match level value for each thread marked as accessing said keyboard, said match level value being incremented by a first value when said write data matches said read data and decrementing said match level value by a second value when said write data does not match any read data in said circular buffer;

eighth program instructions to selectively clear and set a keyboard logger detected flag for said thread responsive to said match level value; and wherein said fourth, fifth, sixth, seventh, and eighth program instructions are recorded on said medium.

9. A computer system for kernel based detection of keyboard logger applications, comprising:

a processor; a call interface to said kernel configured for characterizing a system call pattern for processes accessing a keyboard;

a monitor thread for iteratively examining a plurality of threads to test open( ), read( ), write( ), and syscall( ), or other data input/output system routines for conditions indicative of presence of a keyboard logger application, and indicators for marking as a possible keyboard logger a thread whose system call pattern is characterized by at least one of said conditions.

10. The system of claim 9, further comprising:

storage for maintaining a pattern of system calls on a per thread basis;

said monitor thread for iteratively examining said plurality of threads in said storage;

said monitor thread identifying a first of said plurality of threads that is relatively active against a threshold value on rate of system calls as not a keyboard logger application; and said monitor thread identifying a second of said plurality of threads as said keyboard logger application where write data substantially matches keystrokes, and read( ) and write( ) system calls predominate and are issued relatively slowly.

* * * * *